April 28, 1953

E. A. ROCKWELL 2,636,511

MAXIMUM PRESSURE CONTROL VALVE

Original Filed Oct. 2, 1943

INVENTOR
Edward A. Rockwell
BY
Arthur Wright
ATTORNEY

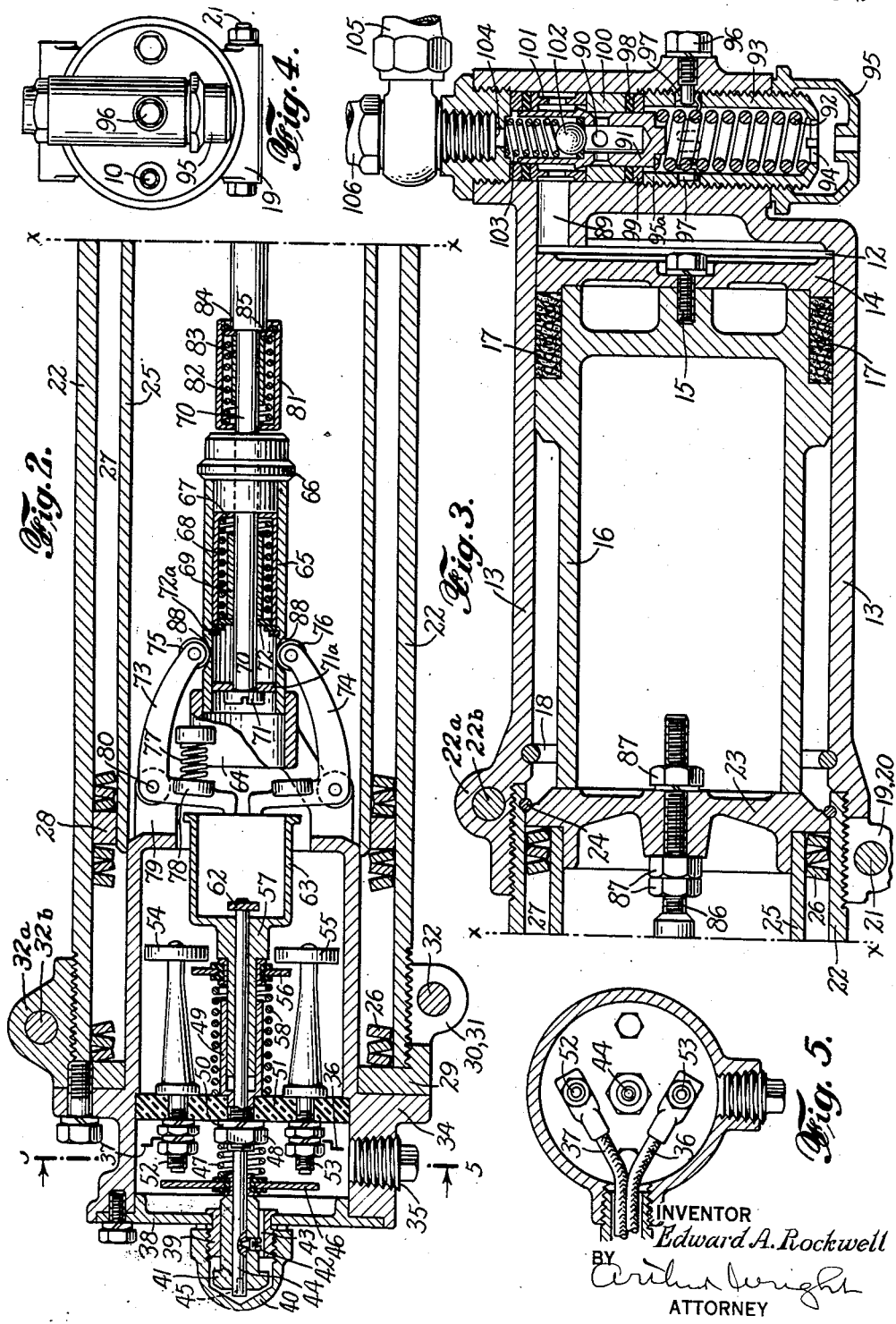

Patented Apr. 28, 1953　　　　　　　　　　　　　　　　　　　　　　　　　　2,636,511

UNITED STATES PATENT OFFICE 2,636,511

MAXIMUM PRESSURE CONTROL VALVE

Edward A. Rockwell, Shaker Heights, Ohio, assignor to The New Britain Machine Company, New Britain, Conn., a corporation of Connecticut Application October 2, 1943, Serial No. 504,807, now Patent No. 2,404,095, dated July 16, 1946, which is a division of application Serial No. 312,356, January 4, 1940, now Patent No. 2,331,800, dated October 12, 1943. Divided and this application June 5, 1946, Serial No. 674,509. In Canada December 30, 1940

18 Claims. (Cl. 137—512.2)

My invention relates particularly to valves for the control or regulation of fluid pressures generally, but it has application particularly to the control of hydraulic pressures, as for instance pressures delivered from an accumulator.

The object of my invention is to provide a valve or valve means for controlling or regulating the supply of fluid pressures in an advantageous manner, although it has especial applicability for the delivery and maintenance of maximum hydraulic pressures. A further object of my invention is to provide a valve mechanism in which there is a normally open valve in a hydraulic line supplied with fluid pressures, said valve being so constructed as to maintain the desired maximum range of pressures. A further object is to provide a check valve in a line supplied with a hydraulic pressure liquid which is adapted to close when the pressure falls below a given maximum. Still another object is to provide an effective means for constructing and assembling the valve mechanism by supporting the said valve between springs so as to retain the valve normally open due to the force of one of said springs. Again, a further object is to provide a ball check valve within a plunger valve, the latter being normally opened by a strong spring and the ball valve being normally seated by a small spring. A further object is to provide means for assembling the ball valve and plunger valve, together with their operating springs as an assembly in a valve casing. Also, another object is to provide means for adjusting the force of the strong spring which normally maintains the plunger valve open. Further objects of my invention will appear from the detailed description of the same hereinafter.

This application is a division of my application upon Accumulating Apparatus, Serial No. 504,807, filed October 2, 1943, now Patent No. 2,404,095 issued July 16, 1946, which application is a division of my application number 312,356 filed January 4, 1940, now Patent No. 2,331,800, granted October 12, 1943, upon System for Controlling the Application of Power.

While my invention is capable of embodiment in many different forms, for the purpose of illustration I have shown only one form thereof in the accompanying drawings, in which—

Fig. 1 is a diagrammatic elevation of the accumulator shown as being associated with a supply reservoir, as well as with an intermittently acting electrically driven pump for charging the accumulator;

Figs. 2 and 3 together constitute a vertical section of the accumulator shown therein;

Fig. 4 is an end elevation of the same; and

Fig. 5 is a vertical section thereof taken on line 5—5 of Fig. 2.

Figure 1:
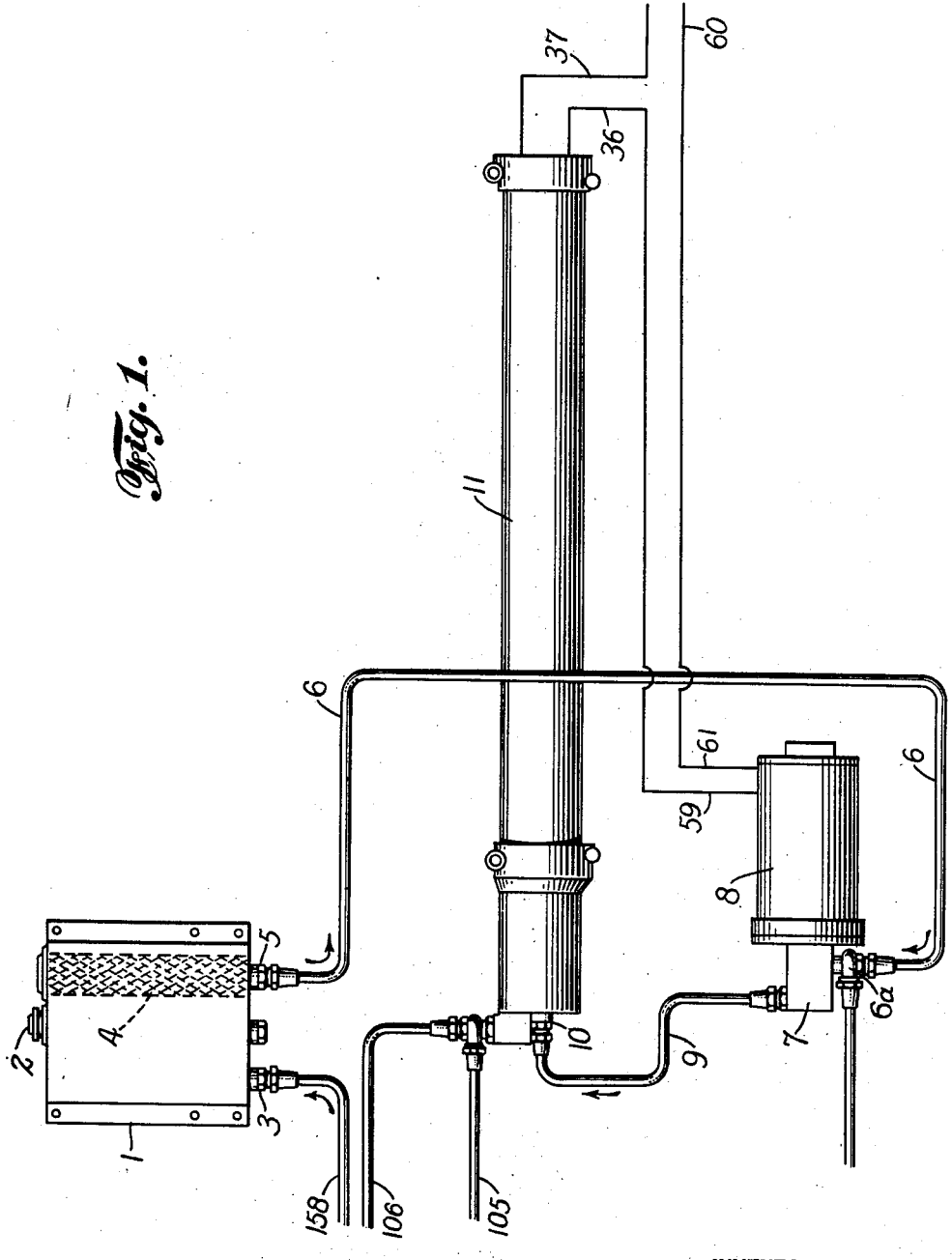

In accordance with my invention I have provided therein a reservoir gravity-feed tank 1 having a filler opening 2, an inlet 3 for the returned discharged liquid, which may be a hydraulic brake fluid or any other suitable liquid, and a removable cylindrical screen filter 4 located over an outlet or supply opening 5 which leads by a pipe 6, having a branch inlet pipe 6a for returned discharged liquid, to a rotary pump 7 which may, for example, be any desired type of gear pump. This is driven by an electric motor 8.

Pressure liquid is thus supplied from the pump 7 by a pipe 9 to an inlet 10 on a pressure controller 11. The pressure fluid from the pump 7 is thence received directly in a chamber 12 in a cylinder 13 so as to force to the left, in Figs. 2 and 3, a movable member or piston 14 which is mounted by means of a screw 15 on a plunger 16 between which piston 14 and plunger 16 there is a chevron packing 17, of suitable material. A snap ring stop 18 for the plunger 16 is located at the left of the cylinder 13, which latter is screw-threaded, and provided with a pair of ears 19 and 20, on the split end of said cylinder 13, secured together with a bolt 21, for screw-threaded attachment to a spring casing 22, so as to hold the screw-threaded end of the cylinder 13 fixedly on the spring casing 22. Also above and opposite to the ears 19 and 20 there is a lug 22a having a bolt 22b therein for supporting an end of the accumulator from the automobile chassis in any desired way. The said plunger 16 rests against the face of a spring retainer plate 23. The spring casing 22 also has a split ring stop 24 for the retainer plate 23, which is also provided with an internal sleeve 25 to act as a guide for a plurality of Belleville spring washers 26 which are merely dished rings of spring steel. As shown in the drawings, the said rings 26 are located so that the adjacent rings have their dished portions extending in opposite directions, said rings being thus carried in an annular chamber 27 between the casing 22 and the guide 25 at intervals along the chamber 27. Between groups of the spring washers 26 there are ring-shaped blocks 28 to aid in maintaining the alignment of the spring washers 26. The left end of the chamber 27 is closed by a screw-threaded cap 29, having adjacent to a split end of the cap 29 a pair of ears 30 and 31, screw-threaded to the spring casing 22 and clamped together by a bolt 32, so as to hold the cap 29 tightly on the cylinder 22. Also, above and opposite to the ears 30 and 31 there is a lug 32a having a bolt 32b therein for supporting the end of the accumulator from the automobile chassis in any desired way. Bolted to the left face of the cap 29 there is a cylindrical switch housing 34, which extends inwardly within the washer 26, the same having a removable screw-plug 35 to permit access to the switch terminals for leads 36 and 37, leading to the switch terminals. A cover plate 38 is bolted to the switch housing 34. In said cover plate 38 there is a sleeve 39 having a screw-threaded cap 40 to hold in place a sleeve 41 which has a screw 42 adapted to be received in a slot 43 in the sleeve 39. Said screw 42 also fastens in position an adjustable switch supporting rod 44 provided with a screw-threaded hole 45 to aid in the removal thereof. Slidably mounted on the rod 44 there is a copper plate 46 which operates as a starting switch in the initial starting or setting of the switch apparatus, said plate 46 being normally held in its farthest position to the left by a light spring 47. The other end of said spring 47 abuts against a nut 48 on a sleeve 49 carried on the rod 44, said nut 48 having a washer 50 spacing it from an insulated ring 51 carried on the sleeve 49 and which supports two rod-shaped terminals 52 and 53 connected to said leads 37 and 36 respectively. The copper plate 46 is designed to initially close the circuit manually between the said two rods 52 and 53. The right-hand end of the rods 52 and 53 have screw-threaded thereto conducting plates 54 and 55 which are designed, in the automatic operation of the apparatus, to close the circuit with a copper disk 56 carried on a circuit-breaker sleeve 57 slidable within the sleeve 49 and normally held towards the right in Figs. 2 and 3 by a spring 58 to close the said circuit. It will be noted that the lead 36 is connected to one terminal 59 at one side of the motor 8 and the other lead 37 leads to any suitable source of electrical energy, as, for example, a battery, not shown, which latter is also connected by a lead 60 to a terminal 61 on said motor. The right-hand end of the rod 44 has a stop 62 cooperating with the interior of a shell 63 which is formed on the end of the circuit breaker sleeve 57. This shell 63 is adapted to be moved for the automatic making and breaking of the pumping circuit by a ring 64 mounted on a cylindrical member 65 carrying within the same a snap action circuit breaking member 66, the inner left portion of which rests against a spring housing 67, having a spring 68 within the same carried on the outside of a sleeve 69 which overlies a rod 70, having a headed screw 71 and a washer 71a supporting near one end thereof a washer 72 held in place by a snap ring 72a to retain said spring 68 in place.

The said snap action circuit breaking member 66 cooperates with two bell-crank levers 73 and 74 having rollers 75 and 76 thereon, which latter are forced against the face of the cylindrical member 65 by springs 77, resting against extensions 78 on arms of the bell-crank levers 73 and 74 which are carried by means of pivots 80. The arms 79 form a part of the switch housing 34. The rod 70, after passing through the snap action member 66, at the right thereof, carries a spring sleeve 81 having therein a spring 82 supported on a sleeve member 83 around the rod 70, which latter has a shoulder 84 supporting an end washer 85 to act as a retainer for said spring 82. The right-hand end of rod 70 has a screw-thread 86 which is secured within the spring retainer plate 23 by means of nuts 87. Notches 88 in the face of the cylindrical member 65 also cooperate with said rollers 75 and 76 so as to retain the pump circuit broken when the pressure-liquid line is broken, that is to say when the piston 14 is at the extreme right-hand end of the cylinder 13. These notches 88 can thus come into action to insure maintaining the pump circuit open when the movable member or piston 14 has moved to its extreme forward position to the right of Fig. 3. However, when the said liquid line is complete and the pump motor has been started manually by moving the copper plate 46 to the right, the pump will be started to supply the pressure liquid therefrom to the cylinder 12 and the piston 14 will move to the left, accordingly, until the snap action circuit breaker 66 breaks the circuit when the desired pressure has been accumulated, so that, thus, liquid is supplied from the cylinder 12 through a port 89 and thence through radial ports 90 in a check valve sleeve 91 which is normally kept in elevated position by means of a spring 92 carried in a cage 93 screw-threaded into the end of the cylinder 13. The lower end of the cage 93 has a slotted opening 94 to permit removal thereof, the same being covered with a screw-threaded apertured dust cap 95. Above the cage 93 there is a screw sleeve 95a, the adjusted position of the sleeve being maintained by a screw 96 cooperating with a series of slots 97 in said sleeve. This adjustment of the sleeve 95a also permits the tightening of an annular seal 98 located above a washer 99, the seal 98 being supported on the other face thereof by a spacing member 100 which rests against an apertured sleeve 101 within which the valve member 91 slides. A check valve 102 is carried within the sleeve member 91 and is held on its seat by a spring 103. The pressure liquid which is thus supplied by the force from the piston 14 is discharged past the check valve 102 and thence to a discharge port 104 leading to a pipe 105, this discharged pressure being a uniform pressure, preferably of about 500 lbs. per square inch. Another discharge pipe 106 conveys the pressure liquid at this same pressure from the discharge port 104 to any desired part to be moved, of an automobile or any other apparatus.

In the operation of the controlling mechanism, it will be understood that the same is supplied from the supply reservoir 1 which conveys the liquid by the pipe 6 to the rotary pump 7, driven by the electric motor 8. The liquid, placed under pressure by the pump 7, is delivered by the pipe 9 to the inlet 10 of the controller 11 so that any desired pressure is maintained thereby. Preferably, however, the controller is so constructed as to maintain a pressure, for example, of approximately 1000 lbs. per square inch. The liquid, under pressure, received in the inlet 10 from the pump 7 forces the piston 14 to the left, in Figs. 2 and 3, so as to place the spring washers 26 under compression. This continues until the circuit breaking member 66 passes beneath the rollers 75 and 76 so as to cause the cylindrical member 65 to move suddenly towards the left, thus causing the circuit breaker sleeve 57 to break the contact between the copper disk 56 and the conducting plates 54 and 55, so as to stop the motor 8 and the pump 7. This condition of the circuit, including the wires 36, 37, 59, 60 and 61, will continue until sufficient liquid has passed from the controller through the passageway 89, past the check valve 102 until the circuit breaking member 66 has been moved suddenly to the right-hand side of the rollers 75 and 76 so as to permit the spring 58 to again complete the motor circuit between the copper disk 56 and the conducting plates 54 and 55, whereupon the pump 7 will again charge the controller. In this way a constant pressure is maintained in the controller 11, irrespective of the extent of withdrawal of the liquid therefrom through the passageway 89. In the initial starting of the controller it will be understood that the copper plate 46 is arranged to be moved manually in opposition to the spring 47 in order to complete the circuit between the two rods 52 and 53. It will be understood, also, that the liquid which has been supplied under pressure from the pipes 105 and 106, after having been used or released from being under pressure, may return by the inlet 3 to the reservoir 1 or may be returned to the pump 7 by means of the pipe 6a.

While I have described my invention above in detail I wish it to be understood that many changes may be made therein without departing from the spirit of the same.

I claim:

1. In combination, an inlet for fluid under pressure, an outlet for the delivery of the pressure fluid, said outlet having a spring-pressed valve therein provided with a spring normally holding the valve open by spring pressure urging the valve in a direction against back pressure in said outlet, and a check valve, seating in the same direction as said spring-pressed valve, and closed by the back pressure from said outlet to prevent back flow from said outlet, said check valve being located within said spring-pressed valve.

2. In combination, an inlet for fluid under pressure, an outlet for the delivery of the pressure fluid, said outlet having a spring-pressed valve therein provided with a spring normally holding the valve open by spring pressure urging the valve in a direction against said back pressure in said outlet and said valve having therein also a check valve, seating in the same direction as said spring-pressed valve, and between which check valve and said inlet said spring-pressed valve is located to prevent back flow from said outlet, said check valve being located within said spring-pressed valve.

3. In combination, an inlet for fluid under pressure, an outlet for the delivery of the pressure fluid, said outlet having a spring-pressed valve therein provided with a spring normally holding the valve open by spring pressure urging the valve in a direction against back pressure in said outlet and said valve having therein also a check valve, seating in the same direction as said spring-pressed valve, and between which check valve and said inlet said spring-pressed valve is located to prevent back flow from said outlet, said check valve being located within said spring-pressed valve, the spring-pressed valve being in the form of a sleeve carrying therein a valve seat and a spring for forcing the check valve on the valve seat.

4. In combination, an inlet for fluid under pressure, an outlet for the delivery of the pressure fluid, said outlet having a spring-pressed valve therein provided with a spring normally holding the valve open by spring pressure urging the valve in a direction against back pressure from said outlet, said valve being provided with a plunger with a spring and a check valve, seating in the same direction as said spring-pressed valve, and closed by said last mentioned spring and by the back pressure from said outlet to prevent back flow from said outlet, said check valve being located within said spring-pressed valve.

5. In combination, an inlet for fluid under pressure, an outlet for the delivery of the pressure fluid, said outlet having a spring-pressed valve therein provided with a spring normally holding the valve open by spring pressure urging the valve in a direction against back pressure from said outlet, said valve being provided with a plunger with a spring and having therein also a check valve, seating in the same direction as said spring-pressed valve, and between which check valve and said inlet said spring-pressed valve is located to prevent back flow from said outlet, said check valve being located within said spring-pressed valve.

6. In combination, an inlet for fluid under pressure, an outlet for the delivery of the pressure fluid, said outlet having a spring-pressed valve therein provided with a spring normally holding the valve open by spring pressure urging the valve in a direction against back pressure from said outlet, said valve being provided with a plunger with a spring and having therein also a check valve, seating in the same direction as said spring-pressed valve, and between which check valve and said inlet said spring-pressed valve is located to prevent back flow from said outlet, said check valve being located within said spring-pressed valve, the said spring-pressed valve being in the form of a sleeve carrying therein a valve seat and a spring for forcing the check valve on the valve seat.

7. In combination, an inlet for fluid under pressure, an outlet for the delivery of the pressure fluid, said outlet having a spring-pressed valve therein provided with a spring normally holding the valve open by spring pressure urging the valve in a direction against back pressure from said outlet, said valve being provided with a plunger in an adjustable seal and a spring with a check valve, seating in the same direction as said spring-pressed valve, and closed by the back pressure from said outlet to prevent back flow from said outlet, said check valve being located within said spring-pressed valve.

8. In combination, an inlet for fluid under pressure, an outlet for the delivery of the pressure fluid, said outlet having a spring-pressed valve therein provided with a spring normally holding the valve open by spring pressure urging the valve in a direction against back pressure from said outlet, said valve being provided with a plunger in an adjustable seal and a spring with a check valve, seating in the same direction as said spring-pressed valve, and closed by the back pressure from said outlet to prevent back flow from said outlet, said check valve being located within said spring-pressed valve, said spring-pressed valve having therein the check valve between which check valve and said inlet said spring-pressed valve is located.

9. In combination, an inlet for fluid under pressure, an outlet for the delivery of the pressure fluid, said outlet having a spring-pressed valve therein provided with a spring normally holding the valve open by spring pressure urging the valve in a direction against back pressure from said outlet, said valve being provided with a plunger in an adjustable seal and a spring, said plunger having therein also a check valve, seating in the same direction as said spring-pressed valve, and between which check valve and said inlet said spring-pressed valve is located to prevent back flow from said outlet, said check valve being located within said spring-pressed valve, the said plunger being in the form of an imperforate sleeve carrying therein a valve seat and the spring for forcing the check valve on the valve seat.

10. In combination, an inlet for fluid under pressure, an outlet for the delivery of the pressure fluid, said outlet having a conical spring-pressed valve provided with an adjustable spring normally holding the valve open by spring pressure urging the valve in the direction against the back pressure which seats the valve and a check valve, seating in the same direction as said spring-pressed valve, and closed by back pressure from said outlet to prevent back flow from said outlet, said check valve being located within said spring-pressed valve.

11. In combination, an inlet for fluid under pressure, an outlet for the delivery of the pressure fluid, said outlet having a conical spring-pressed valve provided with an adjustable spring normally holding the valve open by spring pressure urging the valve in the direction against the back pressure which seats the valve and said valve having therein also a check valve, seating in the same direction as said spring-pressed valve, and between which check valve and said inlet said spring-pressed valve is located to prevent back flow from said outlet, said check valve being located within said spring-pressed valve.

12. In combination, an inlet for fluid under pressure, an outlet for the delivery of the pressure fluid, said outlet having a conical spring-pressed valve provided with an adjustable spring normally holding the valve open by spring pressure urging the valve in the direction against the back pressure which seats the valve and said valve having therein also a check valve, seating in the same direction as said spring-pressed valve, and between which check valve and said inlet said spring-pressed valve is located to prevent back flow from said outlet, said check valve being located within said spring-pressed valve, the said spring-pressed valve being in the form of an imperforate sleeve carrying therein a valve seat and a spring for forcing the check valve on the valve seat.

13. A valve casing having therein an inlet for fluid under pressure, an outlet for the delivery of the pressure fluid, said outlet having a conical spring-pressed valve provided with an adjustable spring normally holding the valve open by spring pressure urging the valve in the direction against the back pressure which seats the valve, a check valve, seating in the same direction as said spring-pressed valve, and closed by the back pressure from said outlet to prevent back flow from said outlet, said check valve being located within said spring-pressed valve and a perforated inlet sleeve around the conical valve.

14. A valve casing having therein an inlet for fluid under pressure, an outlet for the delivery of the pressure fluid, said outlet having a conical spring-pressed valve provided with an adjustable spring normally holding the valve open by spring pressure urging the valve in the direction against the back pressure which seats the valve, said valve having therein also a check valve, seating in the same direction as said spring-pressed valve, and between which check valve and said inlet said spring-pressed valve is located to prevent back flow from said outlet, said check valve being located within said spring-pressed valve and a perforated inlet sleeve around the conical valve.

15. A valve casing having therein an inlet for fluid under pressure, an outlet for the delivery of the pressure fluid, said outlet having a conical spring-pressed valve provided with an adjustable spring normally holding the valve open by spring pressure urging the valve in the direction against the back pressure which seats the valve and said valve having therein also a check valve, seating in the same direction as said spring-pressed valve, and between which check valve and said inlet said spring-pressed valve is located to prevent back flow from said outlet, said check valve being located within said spring-pressed valve, the said spring-pressed valve being in the form of an imperforate sleeve carrying therein a valve seat, a spring for forcing the check valve on the valve seat, and a perforated inlet sleeve around the conical valve.

16. A valve casing having therein an inlet for fluid under pressure, an outlet for the delivery of the pressure fluid, said outlet having a conical spring-pressed valve provided with an adjustable spring normally holding the valve open by spring pressure urging the valve in the direction against the back pressure which seats the valve and a check valve, seating in the same direction as said spring-pressed valve, and closed by back pressure from said outlet to prevent back flow from said outlet, said check valve being located within said spring-pressed valve, an end closure in which the outlet is carried, and a perforated inlet sleeve around the conical valve supported between the first mentioned valve and the inlet.

17. A valve casing having therein an inlet for fluid under pressure, an outlet for the delivery of the pressure fluid, said outlet having a conical spring-pressed valve provided with an adjustable spring normally holding the valve open by spring pressure urging the valve in the direction against the back pressure which seats the valve and said valve having therein also a check valve, seating in the same direction as said spring-pressed valve, and between which check valve and said inlet said spring-pressed valve is located to prevent back flow from said outlet, said check valve being located within said spring-pressed valve, an end closure in which the outlet is carried, and a perforated inlet sleeve around the conical valve supported between the first mentioned valve and the inlet.

18. A valve casing having therein an inlet for fluid under pressure, an outlet for the delivery of the pressure fluid, said outlet having a conical spring-pressed valve provided with an adjustable spring normally holding the valve open by spring pressure urging the valve in the direction against the back pressure which seats the valve and said valve having therein also a check valve, seating in the same direction as said spring-pressed valve, and between which check valve and said inlet said spring-pressed valve is located to prevent back flow from said outlet, said check valve being located within said spring-pressed valve, the said spring-pressed valve being in the form of a sleeve carrying therein a valve seat, a spring for forcing the check valve on the valve seat, an end closure in which the outlet is carried, and a perforated inlet sleeve around the conical valve supported between the first mentioned valve and the inlet.

EDWARD A. ROCKWELL.

(References on following page)

References Cited in the file of this patent

UNITED STATES PATENTS

| Number | Name | Date |
|---|---|---|
| 423,003 | Vielhaber | Mar. 11, 1890 |
| 423,097 | Vielhaber | Mar. 11, 1890 |
| 527,902 | Taefel | Oct. 23, 1894 |
| 547,506 | DeLong | Oct. 8, 1895 |
| 965,052 | Wainright | July 19, 1910 |
| 1,131,341 | Dieter | Mar. 9, 1915 |
| 1,635,875 | Albrecht | July 12, 1927 |
| 2,187,371 | Cannon | Jan. 16, 1940 |
| 2,401,258 | Livers | May 28, 1946 |
| 2,404,924 | Sacchini | July 30, 1946 |
| 2,504,858 | Majneri | Apr. 18, 1950 |
| 2,526,197 | Cannon et al. | Oct. 17, 1950 |